United States Patent
Makuuchi et al.

(10) Patent No.: US 11,346,791 B2
(45) Date of Patent: May 31, 2022

(54) INSPECTION DEVICE AND INSPECTION METHOD THEREOF

(71) Applicant: Hitachi High-Tech Corporation, Tokyo (JP)

(72) Inventors: Masami Makuuchi, Tokyo (JP); Toshifumi Honda, Tokyo (JP); Nobuhiro Obara, Tokyo (JP); Shunichi Matsumoto, Tokyo (JP); Akira Hamamatsu, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 0 days.

(21) Appl. No.: 16/971,963

(22) PCT Filed: Feb. 28, 2018

(86) PCT No.: PCT/JP2018/007384
§ 371 (c)(1),
(2) Date: Aug. 21, 2020

(87) PCT Pub. No.: WO2019/167151
PCT Pub. Date: Sep. 6, 2019

(65) Prior Publication Data
US 2020/0393388 A1 Dec. 17, 2020

(51) Int. Cl.
*G01N 21/95* (2006.01)
*G01N 21/47* (2006.01)

(52) U.S. Cl.
CPC ......... *G01N 21/9505* (2013.01); *G01N 21/47* (2013.01); *G01N 2201/06113* (2013.01)

(58) Field of Classification Search
CPC .............. G01N 21/47; G01N 21/9505; G01N 2201/06113; G01N 21/94; G01N 21/9501
(Continued)

(56) References Cited

U.S. PATENT DOCUMENTS

| 4,667,256 A | 5/1987 | Vergona |
| 7,548,308 B2 | 6/2009 | Mcmillan et al. |

(Continued)

FOREIGN PATENT DOCUMENTS

| JP | 50104659 | 8/1975 |
| JP | S63122937 A | 5/1988 |

(Continued)

OTHER PUBLICATIONS

Search Report dated May 22, 2018 in International Application No. PCT/JP2018/007384.
(Continued)

*Primary Examiner* — Tri T Ton
(74) *Attorney, Agent, or Firm* — Miles & Stockbridge, P.C.

(57) ABSTRACT

An inspection device capable of inspecting a foreign matter even during rotation acceleration/deceleration of an object under inspection. The inspection device includes a rotation-and-translation unit configured to rotate and translate the object under inspection; a light intensity modulation unit configured to modulate intensity of laser light to irradiate the object under inspection; a light intensity control unit configured to control the light intensity modulation unit; an object-under-inspection-operation detection unit configured to calculate information about a linear speed at a laser irradiation position on the object under inspection; a data processing unit configured to start foreign matter and defect inspection when a rotation speed of the object under inspection reaches a predetermined speed and a rotation-and-translation control unit configured to determine a time required for a next single rotation of a rotation stage, and apply, to a translation stage, a translation control value for moving the translation stage.

7 Claims, 4 Drawing Sheets

(58) Field of Classification Search
USPC ............. 356/237.1–237.6, 239.1–239.8, 446
See application file for complete search history.

(56) References Cited

U.S. PATENT DOCUMENTS

| | | |
|---|---|---|
| 7,787,114 B2 | 8/2010 | Wolters et al. |
| 8,193,468 B2 | 6/2012 | Cordingley |
| 2005/0254065 A1 | 11/2005 | Stokowski |
| 2006/0256325 A1 | 11/2006 | Mcmillan et al. |
| 2007/0013898 A1 | 1/2007 | Wolters et al. |
| 2007/0268484 A1 | 11/2007 | Matsui |
| 2008/0304069 A1 | 12/2008 | Wolters et al. |
| 2009/0040511 A1 | 2/2009 | Wolters et al. |
| 2009/0201483 A1 | 8/2009 | Janssens et al. |
| 2010/0004875 A1 | 1/2010 | Urano et al. |
| 2010/0193481 A1 | 8/2010 | Osako |
| 2011/0220815 A1 | 9/2011 | Sakuma |
| 2011/0298156 A1 | 12/2011 | Hooper |
| 2012/0019816 A1 | 1/2012 | Shibata et al. |
| 2012/0133928 A1 | 5/2012 | Urano |
| 2013/0077086 A1 | 3/2013 | Chuang |
| 2013/0141715 A1 | 6/2013 | Urano |
| 2015/0077758 A1 | 3/2015 | Luthi |
| 2015/0192461 A1 | 7/2015 | Chen |
| 2018/0017502 A1 | 1/2018 | Makuuchi et al. |

FOREIGN PATENT DOCUMENTS

| | | |
|---|---|---|
| JP | 2001144357 A | 5/2001 |
| JP | 2007309713 A | 11/2007 |
| JP | 2009501902 A | 1/2009 |
| JP | 2009177176 A | 8/2009 |
| JP | 2010529461 A | 8/2010 |
| JP | 2010190722 A | 9/2010 |
| JP | 4722143 B2 | 7/2011 |
| WO | 2016121756 A1 | 8/2016 |

OTHER PUBLICATIONS

Written Opinion dated May 22, 2018 in International Application No. PCT/JP2018/007384.

[FIG. 1]
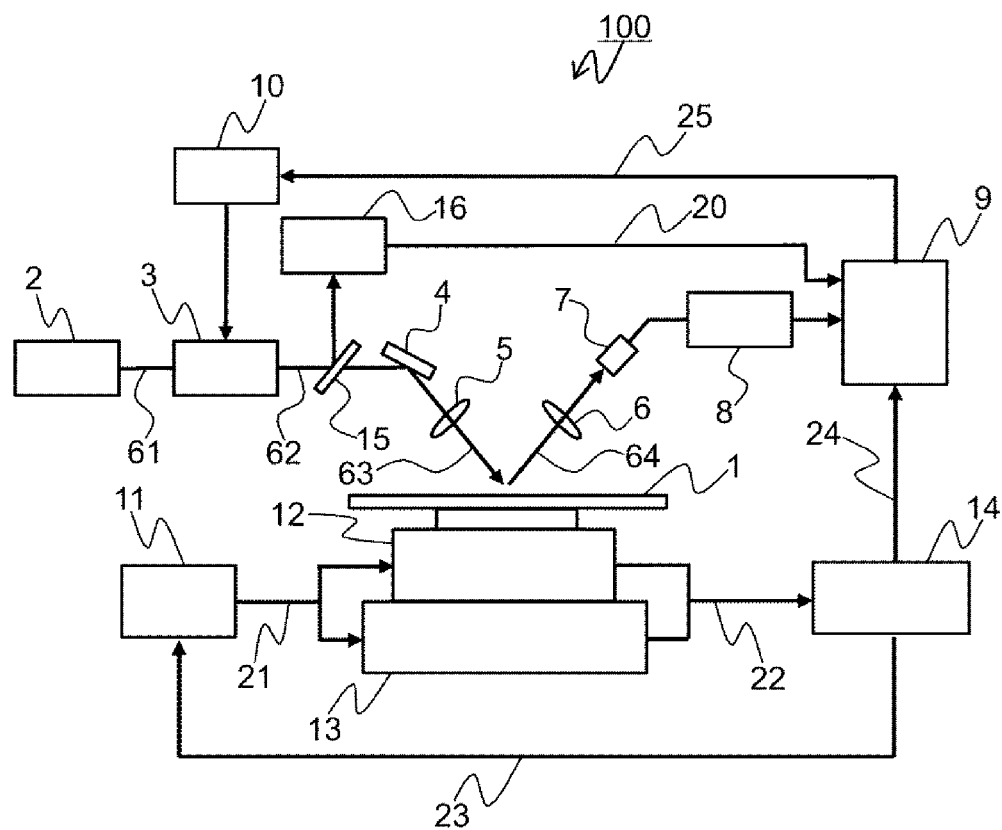

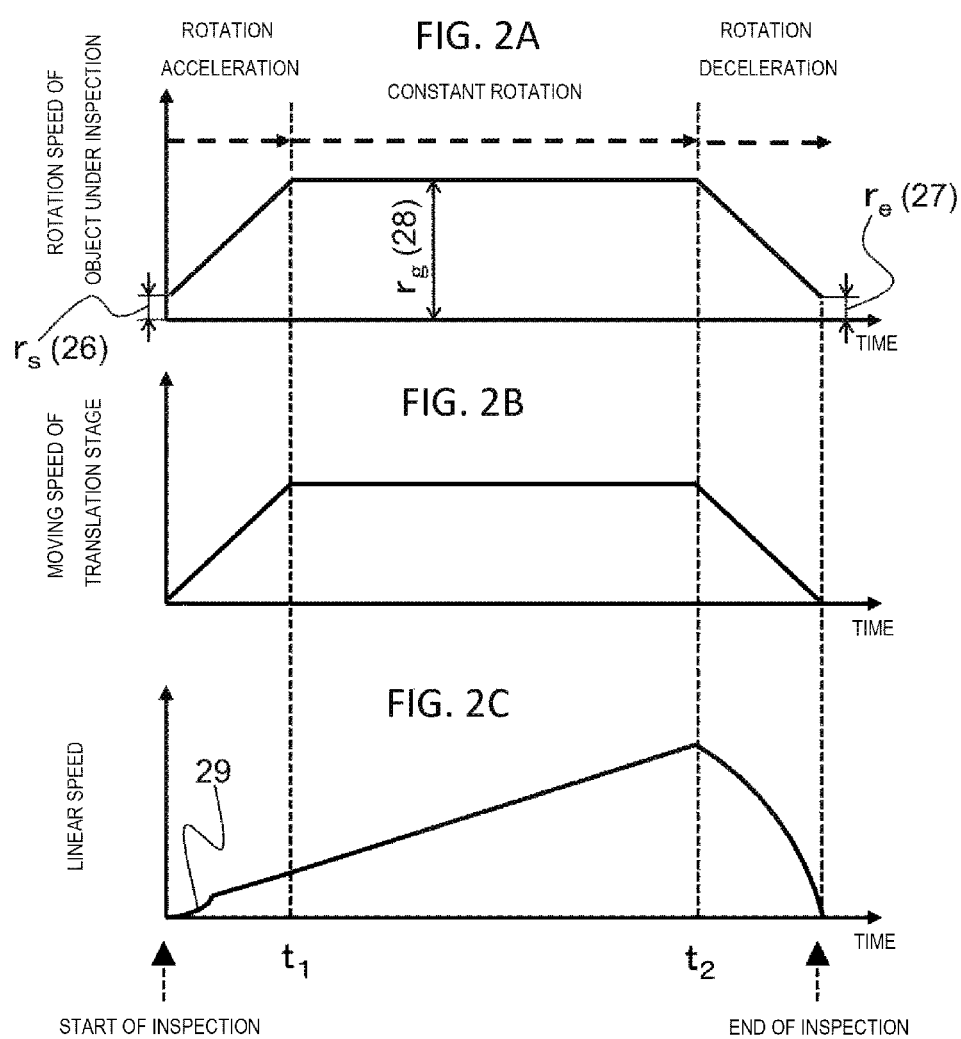

[FIG. 4]
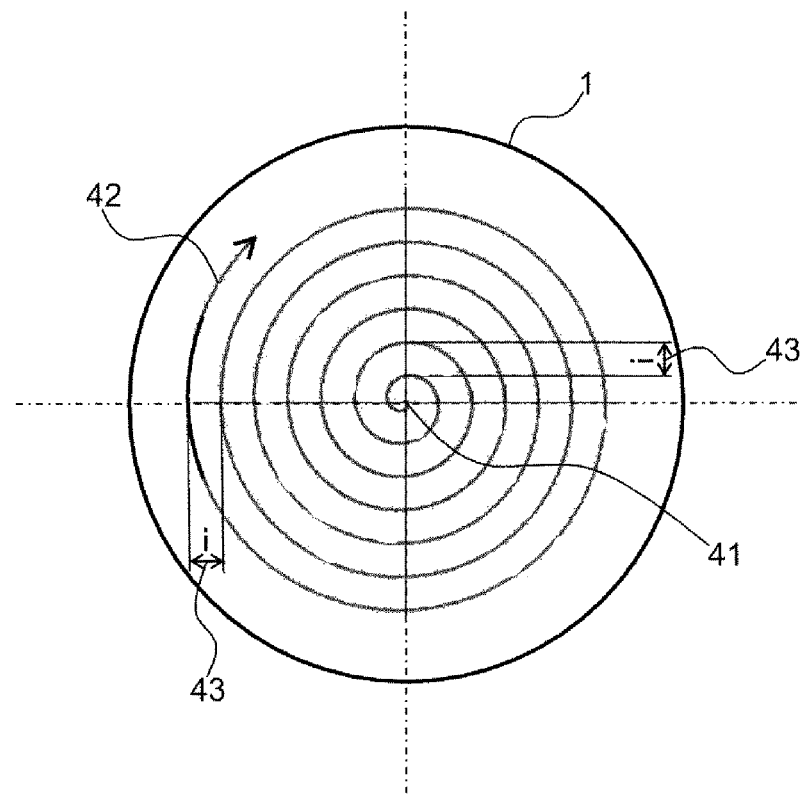
[FIG. 5]
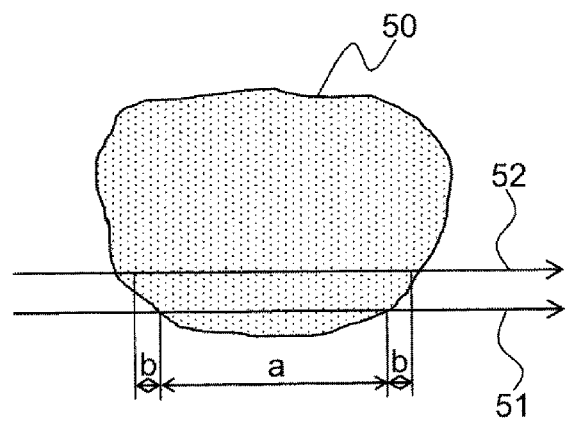

INSPECTION DEVICE AND INSPECTION METHOD THEREOF

TECHNICAL FIELD

The present invention relates to a small foreign matter inspection device and an inspection method thereof for inspecting a foreign matter or a defect on an object under inspection such as a wafer, a thin film substrate, and a photomask by irradiating the object under inspection with light.

BACKGROUND ART

Examples of background art of the present technical field include JP-T-2009-501902 (PTL 1), JP-A-2007-309713 (PTL 2), and U.S. Pat. No. 7,548,308 (PTL 3).

PTL 1 discloses that "Provided are an inspection system, an inspection circuit, and an inspection method for enhancing defect detection by addressing saturation levels of an amplifier and an analog-digital circuit as a factor of limiting a measurement detection range of the inspection system. Also provided are an inspection system, an inspection circuit, and an inspection method for enhancing defect detection by reducing thermal damage to large particles by dynamically changing an incident laser beam power level delivered to a sample during surface inspection scanning." (see Abstract). PTL 1 discloses that a Pockels cell is used as a unit for dynamically changing the incident laser beam power level supplied to the sample. Specifically, the Pockels cell is used as the unit to change the incident laser beam power level (hereinafter referred to as laser power) supplied to the sample, and a voltage applied to the Pockels cell is controlled in order to reduce the thermal damage to large particles. Particles present on the sample wafer may range from small particles to large particles, a large laser power is required to improve detection sensitivity for the small particles, and conversely, the laser power needs to be reduced for a large foreign matter in order to reduce thermal destruction. Therefore, a predetermined voltage is applied to the Pockels cell to switch a rotation angle of a polarization plane of the laser passing through the Pockels cell to control the laser power.

PTL 2 discloses that "In an optical inspection device, when an inspection throughput is emphasized, there is a problem that the detection sensitivity is lower in an outer peripheral portion than in an inner peripheral portion of an object under inspection. Even in the outer peripheral portion of the object under inspection where it is not desired to reduce a stage linear speed, a reduction in an effective total signal amount of a scattered light signal is compensated by increasing illuminance at an illumination spot more than that in the inner peripheral portion while keeping a temperature rise of the object under inspection constant." (see Abstract). Therefore, PTL 2 discloses that an inspection coordinate detection mechanism is provided to detect the linear speed on a wafer based on a main scanning speed and a translation speed at an inspection position on the wafer, and intensity of laser light emitted to the inner peripheral portion and the outer peripheral portion of the wafer is controlled according to the linear speed.

PTL 3 discloses that in order to avoid thermal damage to a wafer due to laser irradiation, a controller for controlling an inspection position on the wafer controls laser light intensity via an optical attenuator.

CITATION LIST

Patent Literature

PTL 1: JP-T-2009-501902
PTL 2: JP-A-2007-309713
PTL 3: U.S. Pat. No. 7,548,308

SUMMARY OF INVENTION

Technical Problem

When, in order to shorten an inspection time for the small foreign matter, the inspection is performed even during rotation acceleration/deceleration of the object under inspection (wafer), which is a waiting time in the related art, a delay time occurs in a rotation-and-translation operation due to inertia of the object under inspection (wafer) or a stage, and the linear speed at which the object under inspection (wafer) is actually scanned deviates from the linear speed obtained from a rotation-and-translation control value. Therefore, when the irradiation laser light intensity is controlled based on the rotation-and-translation control value, an integrated value of the irradiation laser intensity on the object under inspection (wafer) cannot be kept constant, and the intensity of scattered light from the foreign matter on the object under inspection (wafer) changes according to the deviation of the linear speed, making it difficult to perform highly accurate foreign matter inspection. Further, when the large-diameter foreign matter is irradiated with laser light having excessive intensity, the foreign matter may be destroyed or the object under inspection (wafer) may be thermally damaged.

In addition, a time required for one single rotation of the object under inspection (wafer) changes during the rotation of acceleration/deceleration of the object under inspection (wafer). Therefore, in a case where the translation speed cannot be accurately controlled according to the above time, when the translation speed is high with respect to one single rotation of the object under inspection (wafer), a gap region not inspected may be generated on the object under inspection (wafer), making it impossible to perform highly reliable inspection, and when the translation speed is slow with respect to one single rotation of the object under inspection (wafer), the entire inspection time may be increased. The related art has not considered these points.

Therefore, an object of the invention is to provide an inspection device and an inspection method thereof, which is capable of inspecting a foreign matter even during rotation acceleration/deceleration of an object under inspection (wafer).

Solution to Problem

A preferred example of an inspection device according to the invention relates to an inspection device for inspecting a foreign matter and a defect on a surface of an object under inspection. The inspection device includes: a rotation-and-translation unit configured to rotate and translate the object under inspection; a light intensity modulation unit configured to modulate intensity of a laser beam to irradiate the object under inspection with the laser beam; a light intensity control unit configured to control, based on a voltage control signal, the light intensity modulation unit using a plurality of steps; an object-under-inspection-operation detection unit configured to calculate, based on a rotation-and-translation-coordinate detection signal from the rotation-and-translation unit, information about a linear speed at a laser irradiation position on the object under inspection; a data processing unit configured to start foreign matter and defect inspection at a time point when a rotation speed of the object under inspection reaches a predetermined speed during acceleration and to output a voltage control signal for controlling the intensity of the laser beam corresponding to the linear speed; and a rotation-and-translation control unit configured to determine, based on the rotation speed of the object under inspection detected by the object-under-inspection-operation detection unit and a rotation control value, a time required for a next single rotation of a rotation stage, and apply, to a translation stage, a translation control value for moving the translation stage by a predetermined distance during that time.

In addition, as another characteristic of the invention, in the inspection device, the rotation-and-translation control unit applies, to the rotation stage, a deceleration rotation control value at a time point reaching a time to reduce the rotation speed of the object under inspection, and applies, to the translation stage, the translation control value for moving the translation stage by the predetermined distance during the next single rotation of the rotation stage, and the data processing unit ends the inspection at a time point when a translation speed of the translation stage is 0.

Further, as still another characteristic of the invention, in the inspection device, when a foreign matter having a dimension equal to or larger than a predetermined dimension is determined based on scattered light obtained by spirally scanning the object under inspection with laser light, the data processing unit assumes to set, based on a positional relationship shifted in an outer circumferential direction of a spiral trajectory, a size same as the dimension of the foreign matter or a size obtained by adding a predetermined width to both sides of the dimension of the foreign matter to a region where a large-diameter foreign matter is present on a next spiral scanning trajectory, and outputs a voltage control signal for weakening the intensity of the laser light emitted to the region where the large-diameter foreign matter is assumed to be present when emitting the laser light to the next spiral scanning trajectory.

In addition, a preferred example of an inspection method according to the invention relates to an inspection method for inspecting, by using a foreign matter inspection device, a foreign matter and a defect on a surface of an object under inspection. The inspection method includes the following steps of: placing the object under inspection, and a rotation-and-translation unit, configured to cause a rotation operation and a translation operation, starting a rotation operation at an uniform acceleration; starting irradiating a center position of the object under inspection with a laser beam and, concurrently starting the translation operation of the rotation-and-translation unit at a time point when a rotation speed of the object under inspection reaches a predetermined speed; an object-under-inspection-operation detection unit calculating, based on a rotation-and-translation-coordinate detection signal from the rotation-and-translation unit, information about a linear speed at a laser irradiation position on the object under inspection; a rotation-and-translation control unit determining, based on the rotation speed of the object under inspection detected by the object-under-inspection-operation detection unit and a rotation control value, a time required for a next single rotation of a rotation stage, and applying, to a translation stage, a translation control value for moving the translation stage by a predetermined distance during that time; a data processing unit starting foreign matter and defect inspection at a time point when a rotation speed of the object under inspection reaches a predetermined speed during acceleration, and outputting a voltage control signal for controlling intensity of the laser beam corresponding to the linear speed; and a light intensity control unit modulating, based on the voltage control signal, the intensity of the laser beam using a plurality of steps to irradiate the object under inspection with the laser beam.

Advantageous Effect

According to the invention, accurate foreign matter inspection can be achieved by appropriately controlling the irradiation laser light intensity according to the linear speed even during the rotation acceleration/deceleration of the object under inspection (wafer), and the small foreign matter can be inspected in a short time by appropriate rotation-and-translation control over the object under inspection (wafer).

Problems, configurations and effects other than the above will be apparent with reference to the description of following embodiments.

BRIEF DESCRIPTION OF DRAWINGS

FIG. 1 is an example of a configuration diagram of a foreign matter inspection device according to a first embodiment.

FIG. 2A-2C show examples of FIG. 2A a change in a rotation speed of an object under inspection, FIG. 2B a change in a moving speed of a translation stage, and FIG. 2C a change in a linear speed of laser light scanning in the foreign matter inspection device according to the first embodiment.

FIG. 4 is a diagram showing an example in which laser light is emitted in a spiral trajectory from a center position on a surface of the object under inspection.

FIG. 5 is a diagram illustrating a control for weakening laser light intensity on a next laser light scanning line on an outer peripheral side when it is determined that a large-diameter foreign matter is present.

DESCRIPTION OF EMBODIMENTS

Figure 3A:
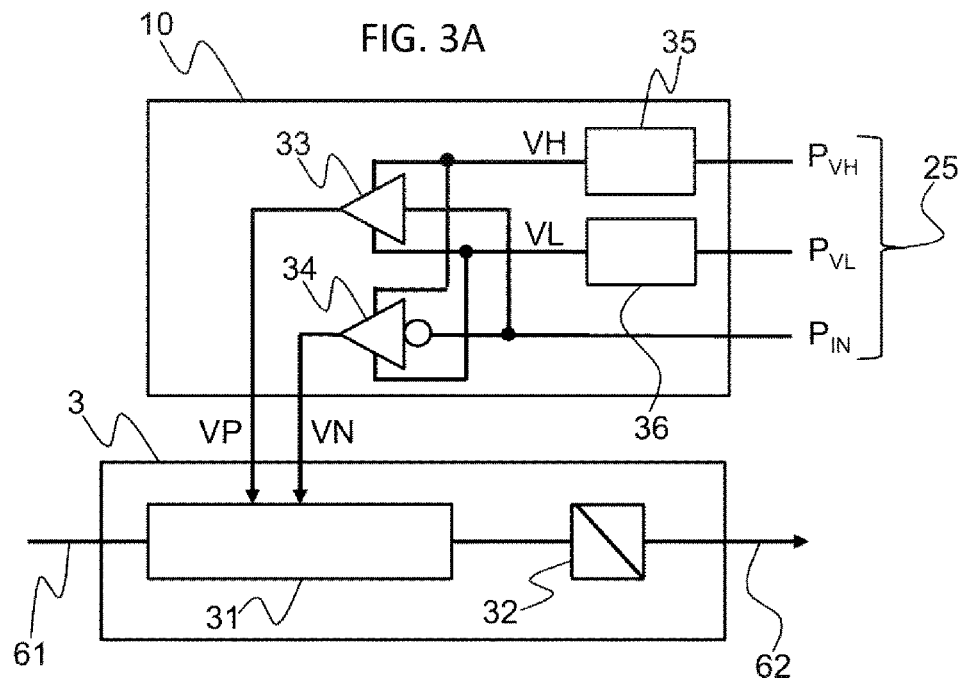
FIG. 3A-3B show 3A a configuration example and 3B an operation example of a light intensity modulation unit and a light intensity control circuit in the foreign matter inspection device according to the first embodiment.

Hereinafter, an embodiment will be described with reference to the drawings.

First Embodiment

In the present embodiment, a circular flat inspection object such as a wafer is assumed as an object under inspection. An example of a foreign matter inspection device for inspecting a small foreign matter on the object under inspection even during acceleration/deceleration of the object under inspection will be described.

FIG. 1 is an example of a configuration diagram of the foreign matter inspection device according to the present embodiment.

A foreign matter inspection device 100 includes a laser light source 2, a light intensity modulation unit 3, a beam splitter 15, a mirror 4, an irradiation lens 5, a condenser lens 6, a photodetector 7, a detection circuit 8, a data processing unit 9, a light intensity control circuit 10, a rotation-and-translation control circuit 11, a rotation stage 12, a translation stage 13, object-under-inspection-operation detection mechanism 14, and an optical power detection unit 16.

In the foreign matter inspection device 100, an object under inspection 1 is set on the rotation stage 12, and the object under inspection 1 is irradiated, via the light intensity modulation unit 3, the beam splitter 15, the mirror 4, and the irradiation lens 5, with laser light 61 output from the laser light source 2. At this time, in the foreign matter inspection device 100, based on a rotation-and-translation control signal 21 from the rotation-and-translation control circuit 11, the object under inspection 1 is rotated by the rotation stage 12 and linearly moved by the translation stage 13.

As shown in FIG. 4, when a central position 41 on a surface of the object under inspection 1 set on the rotation stage 12 (not shown) is irradiated with a laser light 63, according to the operation of the both stages, the laser light 63 emitted onto the object under inspection 1 becomes a spiral trajectory 42 on the entire surface of the object under inspection 1, and the entire surface of the object under inspection 1 can be inspected. Scattered light 64 from the foreign matter on the object under inspection 1 is detected via the condenser lens 6, the photodetector 7, and the detection circuit 8, and the data processing unit 9 inspects the foreign matter based on a detection result of the detection circuit 8.

In the foreign matter inspection device 100 according to the present embodiment, based on a rotation-and-translation-coordinate detection signal 22 including a θ coordinate and an R coordinate of the rotation stage 12 and the translation stage 13, the object-under-inspection-operation detection mechanism 14 generates scanning information 23, 24 of the laser light on the object under inspection 1.

In the present embodiment, the θ coordinate is detected using an optical reading type rotary encoder (not shown) arranged on the rotation stage 12, and the R coordinate is detected using an optical reading type linear encoder (not shown) arranged on the translation stage 13. Alternatively, one using another detection principle may also be used as long as it is a sensor that can detect an angle or a position on a straight line with high accuracy.

The scanning information 23, 24 generated by the object-under-inspection-operation detection mechanism 14 includes, based on the θ coordinate and the R coordinate, at least one of a rotation speed of the object under inspection, an acceleration of the rotation of the object under inspection, a current radial position, a speed and an acceleration of a radial position change, and a linear speed of laser light scanning on the object under inspection 1 at the time of detection of each information. Further, the data processing unit 9 corrects a calculation content or a calculation result of data processing based on the scanning information 24 generated by the object-under-inspection-operation detection mechanism 14.

FIG. 2A-2C show examples of FIG. 2A a change in a rotation speed of the object under inspection, FIG. 2B a change in a moving speed of the translation stage, and FIG. 2C a change in the linear speed of the laser light scanning from the start of inspection to the end of inspection for one object under inspection in the foreign matter inspection device 100 according to the present embodiment.

In a foreign matter inspection device in the related art, the inspection is performed by scanning, with the laser light, the rotation stage 12 kept rotating constantly and the translation stage 13 kept moving constantly. That is, the rotation and the movement of the respective stages are started and accelerated, and when reaching a time point $t_1$, an irradiation position of the laser light is controlled to be the center position 41 of the object under inspection 1. At the time point $t_1$, when a shutter (not shown) for blocking the beam of laser light is opened, scanning of the laser light to be emitted is performed over the entire surface of the object under inspection 1 so as to draw the spiral trajectory 42 at an interval of i43. Then, at a time point t2, the spiral trajectory 42 is controlled to reach an outer peripheral portion of the object under inspection 1 to end the inspection. At the time point t2, the shutter (not shown) for blocking the beam of laser light is closed, and the rotation and the movement of the respective stages are decelerated and stopped. Thereafter, the object under inspection 1 on the rotation stage 12 is replaced, and the next inspection is continued.

In contrast, in the present embodiment, when the rotation of the rotation stage 12 is started and the rotation speed reaches an inspection start rotation speed $r_s26$, the data processing unit 9 starts the inspection. Thereafter, the rotation of the rotation stage 12 continues to be uniformly accelerated, and reaches a constant rotation speed same as that in the related art. The movement of the translation stage 13 starts at a time point when the rotation stage 12 reaches the inspection start rotation speed $r_s26$. Regarding control over the movement of the translation stage 13, the rotation-and-translation control circuit 11 determines, based on the rotation speed of the object under inspection included in the scanning information 23 sent from the object-under-inspection-operation detection mechanism 14 and a rotation control value (rotation-and-translation control signal 21) applied to the rotation stage 12, a time required for one single rotation of the rotation stage 12 from the above time point, and applies, to the translation stage 13, a translation control value (rotation-and-translation control signal 21) so as to move the translation stage 13 by the predetermined interval i43 in the spiral trajectory during that time.

In the present embodiment, at the start of the inspection, the shutter (not shown) for blocking the beam of laser light is opened, and the central position 41 of the object under inspection 1 is irradiated with the laser light. In addition, the movement of the translation stage 13 is started, and the laser light scanning is performed so as to draw the spiral trajectory 42 during the acceleration of both stages, so as to perform the inspection. Then, when the rotation of the rotation stage 12 reaches a target rotation speed $r_g28$, the rotation is kept constant, and similarly, the moving speed of the translation stage 13 is also controlled to be constant. As in the related art, the foreign matter inspection is continued while respective stages are controlled at a constant rotation and a constant speed. However, in the present embodiment, at the time point t2, the spiral scanning of the laser light is at a position before reaching the outer peripheral portion of the object under inspection 1. Thereafter, the deceleration of both stages is controlled while continuing the inspection. (The time point t2 in the present embodiment is different from the time point t2 in the case where both the above stages in the related art are scanned with the laser light for a constant speed to perform the inspection.)

In the present embodiment, at the time point t2, the rotation stage 12 is decelerated by applying a control value for uniform deceleration. Regarding control over the movement of the translation stage 13, the rotation-and-translation control circuit 11 determines, based on the rotation speed of the object under inspection included in the scanning information 23 sent from the object-under-inspection-operation detection mechanism 14 and a rotation deceleration control value (rotation-and-translation control signal 21) applied to the rotation stage 12, a time required for one single rotation of the rotation stage 12 from the above time point, and applies, to the translation stage 13, a translation deceleration control value (rotation-and-translation control signal 21) so as to move the translation stage 13 by the predetermined interval i43 in the spiral trajectory during that time. When the rotation stage 12 decelerates and reaches an inspection end rotation speed $r_e27$, the rotation-and-translation control circuit 11 applies a control value (rotation-and-translation control signal 21) to both stages such that the moving speed of the translation stage 13 is 0. At the end of the inspection, the spiral scanning of the laser light reaches the outer peripheral portion of the object under inspection 1, and the shutter (not shown) for blocking the beam of the laser light is closed.

An acceleration region and a deceleration region of the moving speed of the translation stage shown in FIG. 2B are described to have uniform acceleration/deceleration, but are actually controlled by following the acceleration/deceleration of the rotation stage 12, so that strictly speaking, the acceleration region and the deceleration region do not have uniform acceleration/deceleration.

The change in the linear speed of the laser light scanning in the present embodiment, as shown in FIG. 2C, starts from 0 at the start of the inspection. An immediately after the start 29 is disturbed due to a response delay caused by the acceleration of the translation stage 13 from a speed 0, but thereafter the linear speed accelerates almost linearly until the time point t2. After the time point t2, the linear speed decelerates to 0 along with a response delay.

Figure 3B:
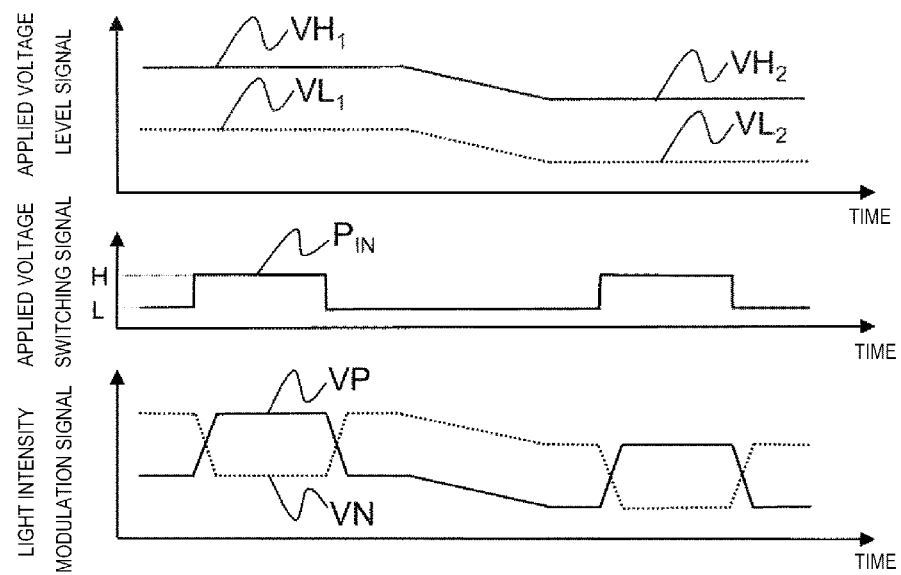

FIG. 3A shows a configuration example and FIG. 3B shows an operation example of the light intensity modulation unit 3 and the light intensity control circuit 10 in the foreign matter inspection device 100 according to the present embodiment.

The light intensity modulation unit 3 shown in FIG. 3A includes a light modulation element 31 and a deflection beam splitter 32. A rotation angle of a polarization plane of the laser light 61 passing through the optical modulation element 31 is changed according to a potential difference between light intensity modulation signals VP and VN applied to the light modulation element 31. Thereafter, the laser light 62 having intensity corresponding to the rotation angle of the polarization plane of the laser light passes through the deflection beam splitter 32.

The light intensity control circuit 10 includes variable voltage generation circuits 35, 36 configured to generate corresponding voltages (VH, VL) based on voltage control signals ($P_{VH}$, $P_{VL}$, $P_{IN}$) 25 from the data processing unit 9, and switching circuits 33, 34. The switching circuit 33 outputs VL when $P_{IN}$ is L and VH when $P_{IN}$ is H to the light intensity modulation signal VP. The switching circuit 34 outputs VH when $P_{IN}$ is L and VL when $P_{IN}$ is H to the light intensity modulation signal VN.

FIG. 3B shows an operation example of the light intensity control circuit 10. A switching signal $P_{IN}$ is a binary signal having potentials of Low and High, and the respective states are represented as L and H. When $P_{IN}$ is L, the switching circuit 33 outputs VL, the switching circuit 34 outputs VH, VP has the same potential as VL, and at the same time, VN has the same potential as VH. As a result, a potential difference of VL−VH is applied to the light modulation element 31.

On the other hand, when $P_{IN}$ is H, the switching circuit 33 outputs VH, the switching circuit 34 outputs VL, VP has the same potential as VH, and at the same time, VN has the same potential as VL. A potential difference of VH−VL is applied to the light modulation element 31.

FIG. 3B shows an example in which switching is performed between the voltage control signals ($P_{VH}$, $P_{VL}$) from the data processing unit 9, ($P_{VH1}$, $P_{VL1}$) or ($P_{VH2}$, $P_{VL2}$) is input, and the variable voltage generation circuits 35, 36 generate (VH$_1$, VL$_1$) or (VH$_2$, VL$_2$), and therefore, a two-stage switching amplitude: |VH$_n$−VL$_n$| and an offset voltage: (VH$_n$+VL$_n$)/2 {where n=1 or 2} are applied to the light modulation element 31.

In the foreign matter inspection device 100 according to the present embodiment, switching is performed in multiple stages (n) between the voltage control signals ($P_{VHn}$, $P_{VLn}$) from the data processing unit 9, and a rotation angle variation of the polarization plane of the laser light caused by the light modulation element 31 can be controlled by using the potential difference: |VP$_n$−VN$_n$| and the offset voltage: (VP$_n$+VN$_n$)/2 of the light intensity modulation signals VP$_n$ and VN$_n$ switched in multiple stages (n).

The data processing unit 9 appropriately processes the signal input from the detection circuit 8 to determine a foreign matter and a defect. At this time, the size of the foreign matter and the defect is determined based on signal intensity. In addition, a coordinate of the foreign matter and the defect is determined by using the scanning information 24 sent from the object-under-inspection-operation detection mechanism 14.

The size of the foreign matter and the defect on the object under inspection 1 of the foreign matter inspection device according to the present embodiment is required to be detected with high accuracy up to several tens of nm or less. As one method for improving the detection sensitivity for the small foreign matter and the defect, it is general to increase the intensity of the laser light. However, when irradiation is performed with laser light having high intensity, large foreign matters over several hundreds of nm are destroyed, debris generated by the destruction diffuses to the surface of the object under inspection and expands a defective region of the object under inspection. Therefore, inspection power needs to be limited.

In the foreign matter inspection device 100 according to the present embodiment, when the control is performed to perform the inspection even during the rotation acceleration/deceleration of the object under inspection, the linear speed of the laser light scanning changes as shown in FIG. 2C. In order to keep the detection sensitivity for the foreign matter and the defect at respective points on the laser light scanning trajectory of the object under inspection constant, it is necessary to keep an integrated value of the irradiation laser intensity at respective points constant. That is, when the linear speed of the laser light scanning is slow, the intensity of the laser light must be low, and when the linear speed of the laser light scanning is fast, the intensity of the laser light must be high.

The data processing unit 9 knows a current linear speed of the laser light scanning on the object under inspection 1 from the scanning information 24 generated by the object-under-inspection-operation detection mechanism 14, generates the voltage control signal ($P_{VHn}$, $P_{VLn}$, $P_{IN}$) 25 corresponding to the linear speed, and outputs the voltage control signal 25 to the light intensity control circuit 10 to adjust the irradiation laser light intensity on the object under inspection 1.

In the present embodiment, the optical power detection unit 16 detects the laser power of the laser light 62 emitted onto the object under inspection 1 via the beam splitter 15, and outputs the detection result 20 to the data processing unit 9. The data processing unit 9 can know the result of adjusting the laser light intensity obtained by outputting the voltage control signal ($P_{VHn}$, $P_{VLn}$, $P_{IN}$) 25. When characteristics of the light modulation element 31 change depending on environmental conditions such as a temperature, and the laser light intensity cannot be adjusted as instructed by the voltage control signal, the corrected voltage control signal ($P_{VHn}$, $P_{VLn}$, $P_{IN}$) 25 is output again to adjust the laser light intensity.

In addition, the data processing unit 9 causes the laser light scanning to be performed on the object under inspection 1 to detect a large-diameter foreign matter 50 as shown in FIG. 5 in first laser beam scanning 51 in a processing of determining a foreign matter and a defect, determines a size of the foreign matter at this time as a, and when a is larger than a predetermined size, determines that a large-diameter foreign matter is present. In this case, in second laser beam scanning 52 next, based on a positional relationship shifted in an outer circumferential direction of the spiral trajectory, a region where the laser beam intensity is weakened is set on a second laser light scanning 52 line to have the foreign matter size a detected by the first laser beam scanning 51 or a foreign matter size a+2b obtained by adding a predetermined addition size b to both sides. Then, when a laser irradiation spot reaches the region on the second laser beam scanning 52 line where the laser beam intensity is weakened, the voltage control signal ($P_{VHn}$, $P_{VLn}$, $P_{IN}$) 25 for weakening the laser light intensity is output to the light intensity control circuit 10. Thereafter, when the laser irradiation spot passes through the region where the laser light intensity is weakened, the voltage control signal ($P_{VHn}$, $P_{VLn}$, $P_{IN}$) 25 for returning the laser light intensity to the original is output to the light intensity control circuit 10. Subsequently, when the laser light is emitted onto the second laser beam scanning 52 line and the scattered light is inspected, and, as a result, it is similarly determined that a large-diameter foreign matter is present, control for weakening the laser light intensity emitted onto a third laser beam scanning line is repeatedly performed. In this way, the laser light intensity is controlled to be momentarily weakened to prevent saturation of the photodetector 7 or burning of the large-diameter foreign matter due to the intensity of the strongly scattered light from the large-diameter foreign matter.

Further, the data processing unit 9 detects a characteristic variation of the light modulation element 31 based on the detection result of the optical power detection unit 16 and adjusts the voltage control signal ($P_{VHn}$, $P_{VLn}$, $P_{IN}$) 25. Accordingly, the variation of the laser power emitted onto the object under inspection 1 for a long time can be prevented.

The data processing unit 9, the rotation-and-translation control circuit 11, and the object-under-inspection-operation detection mechanism 14 according to the present embodiment can be implemented by either hardware or software. In the case of being implemented by hardware, the above unit can be implemented by integrating a plurality of calculation units for executing processing on a wiring board, or in a semiconductor chip or a package. In the case of being implemented by software, the above unit can be implemented by executing a program for executing desired calculation processing by using a central processing unit (CPU) mounted on a device constituting a system or a general-purpose CPU mounted on a general-purpose computer connected to the system.

The invention is not limited to the embodiment described above, and includes various modifications. For example, the embodiment described above has been described in detail for easy understanding of the invention, and the invention is not necessarily limited to those including all of the configurations described above. In addition, a part of the configuration of one embodiment can be replaced with the configuration of another embodiment, and the configuration of another embodiment can be added to the configuration of one embodiment. Further, a part of the configuration of each embodiment can be added to another configuration, omitted, or replaced with another configuration.

Control lines and information lines are considered to be necessary for explanation, and all control lines and information lines are not necessarily shown in the product. It may be considered that almost all the configurations are actually connected to each other.

REFERENCE SIGN LIST 1 object under inspection (wafer)
2 laser light source
3 light intensity modulation unit
4 mirror
5 irradiation lens
6 condenser lens
7 photodetector
8 detection circuit
9 data processing unit
10 light intensity control circuit
11 rotation-and-translation control circuit
12 rotation stage
13 translation stage
14 object-under-inspection-operation detection mechanism
15 beam splitter
16 optical power detection unit
20 detection result of optical power detection unit
21 rotation-and-translation control signal
22 rotation-and-translation-coordinate detection signal
23, 24 scanning information
25 voltage control signal
26 inspection start rotation speed $r_s$
27 inspection end rotation speed $r_e$
28 target rotation speed $r_g$ of rotation stage
29 change in linear speed of laser light scanning immediately after start of inspection
31 light modulation element
32 deflection beam splitter
33 switching circuit 1
34 switching circuit 2
35, 36 variable voltage generation circuit
41 center position on surface of object under inspection 1
42 spiral trajectory of laser light emitted on object under inspection
43 interval i in spiral trajectory 42
50 large-diameter foreign matter
51 first laser beam scanning
52 second laser beam scanning
61 laser light output from laser light source 2
62 laser light whose intensity is modulated by optical intensity modulation unit 3
63 laser light emitted on object under inspection
64 scattered light from foreign matter on object under inspection
100 foreign matter inspection device

The invention claimed is:

1. An inspection device for inspecting a foreign matter and a defect on a surface of an object under inspection, the inspection device comprising:
a rotation-and-translation control circuit configured to rotate and translate the object under inspection using a rotation stage and a translation stage;

a light intensity modulator and deflection beam splitter configured to modulate an intensity of a laser beam to irradiate the object under inspection with the laser beam;

a light intensity control circuit configured to control, based on a voltage control signal, the light intensity modulator using a plurality of steps;

an object-under-inspection-operation detection circuit configured to calculate, based on a rotation-and-translation-coordinate detection signal received from the rotation-and-translation control circuit, information about a linear speed at a laser irradiation position on the object under inspection; and a data processor configured to perform a foreign matter and defect inspection operation beginning at a time point when a rotation speed of the object under inspection reaches a predetermined speed during acceleration,_ and to output a voltage control signal for controlling the intensity of the laser beam corresponding to the linear speed, wherein the rotation-and-translation control circuit is configured to determine, based on the rotation speed of the object under inspection detected by the object-under-inspection-operation detection circuit and a rotation control value, a time required for a next single rotation of the rotation stage, and to apply, to the translation stage, a translation control value for moving the translation stage by a predetermined distance during that time.

2. The inspection device according to claim 1, wherein the rotation-and-translation control circuit applies, to the rotation stage, a deceleration rotation control value at a time point reaching a time to reduce the rotation speed of the object under inspection, and applies, to the translation stage, the translation control value for moving the translation stage by the predetermined distance during the next single rotation of the rotation stage, and the data processor ends the inspection at a time point when a translation speed of the translation stage is 0.

3. The inspection device according to claim 1, wherein when a foreign matter having a dimension equal to or larger than a predetermined dimension is determined based on scattered light obtained by spirally scanning the object under inspection with laser light, the data processor sets, based on a positional relationship shifted in an outer circumferential direction of a spiral trajectory, a size same as the dimension of the foreign matter or a size obtained by adding a predetermined width to both sides of the dimension of the foreign matter to a region where a large-diameter foreign matter is present on a next spiral scanning trajectory, and outputs a voltage control signal for weakening the intensity of the laser light emitted to the region where the large-diameter foreign matter is assumed to be present when emitting the laser light to the next spiral scanning trajectory.

4. The inspection device according to claim 1, wherein the light intensity modulator comprises a light modulation element arranged in series with the deflection beam splitter in an optical axis direction of the laser light.

5. An inspection method for inspecting, by using a foreign matter inspection device, a foreign matter and a defect on a surface of an object under inspection, the inspection method comprising:

placing the object under inspection on a rotation stage and a translation stage;

starting a rotation operation of the rotation stage at a uniform acceleration;

starting irradiating a center position of the object under inspection with a laser beam and, concurrently starting a translation operation of the translation stage at a time point when a rotation speed of the object under inspection reaches a predetermined speed;

calculating, based on a rotation-and-translation-coordinate detection signal from a rotation-and-translation control circuit, information about a linear speed at a laser irradiation position on the object under inspection;

determining, by the rotation-and-translation control circuit, based on the rotation speed of the object under inspection detected by an object-under-inspection-operation detection circuit and a rotation control value, a time required for a next single rotation of the rotation stage, and applying, to the translation stage, a translation control value for moving the translation stage by a predetermined distance during that time;

performing a foreign matter and defect inspection operation using a data processor beginning at a time point when the rotation speed of the object under inspection reaches a predetermined speed during acceleration, and outputting a voltage control signal for controlling an intensity of the laser beam corresponding to the linear speed; and modulating, based on the voltage control signal, the intensity of the laser beam using a plurality of steps to irradiate the object under inspection with the laser beam.

6. The inspection method according to claim 5, further comprising:

applying, to the rotation stage, a deceleration rotation control value at a time point reaching a time to reduce the rotation speed of the object under inspection, and applying, to the translation stage, the translation control value for moving the translation stage by the predetermined distance during the next single rotation of the rotation stage; and ending the foreign matter and defect inspection operation at a time point when a translation speed of the translation stage is 0.

7. The inspection method according to claim 5, wherein when a foreign matter having a dimension equal to or larger than a predetermined dimension is determined based on scattered light obtained by spirally scanning the object under inspection with laser light, the data processor sets, based on a positional relationship shifted in an outer circumferential direction of a spiral trajectory, a size same as the dimension of the foreign matter or a size obtained by adding a predetermined width to both sides of the dimension of the foreign matter to a region where a large-diameter foreign matter is present on a next spiral scanning trajectory, and outputs a voltage control signal for weakening the intensity of the laser light emitted to the region where the large-diameter foreign matter is assumed to be present when emitting the laser light to the next spiral scanning trajectory.

* * * * *